May 14, 1946.    O. F. ULLMAN    2,400,274
SPARE TIRE CARRIER FOR TRUCKS OR THE LIKE
Filed Aug. 6, 1945    2 Sheets-Sheet 1
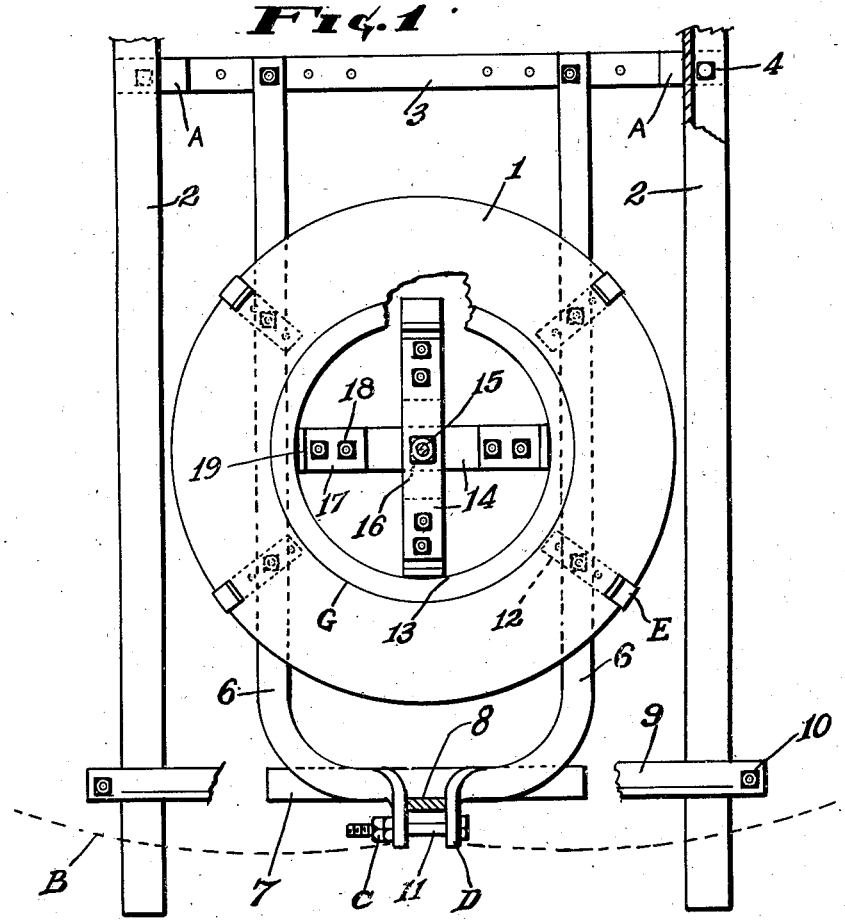
INVENTOR.
OTTO F. ULLMAN May 14, 1946. O. F. ULLMAN 2,400,274
SPARE TIRE CARRIER FOR TRUCKS OR THE LIKE
Filed Aug. 6, 1945 2 Sheets-Sheet 2
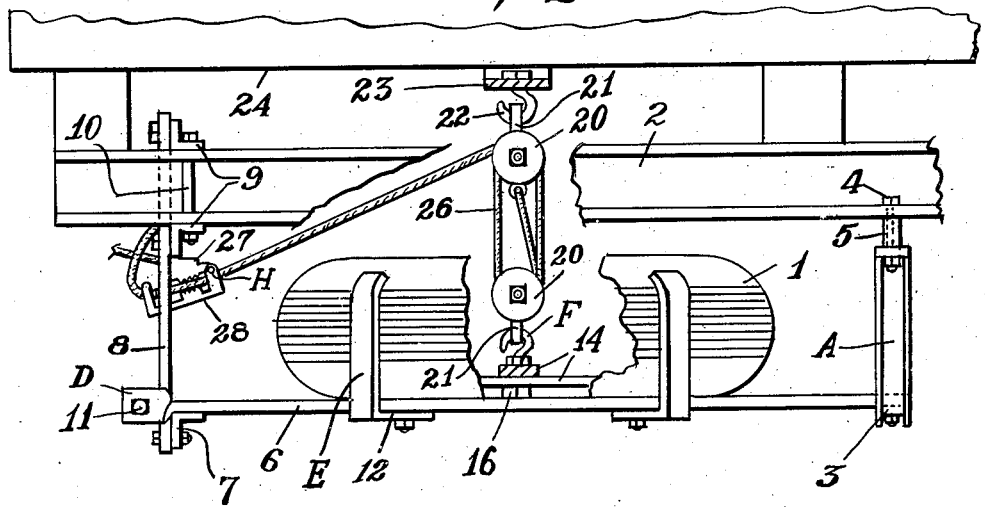
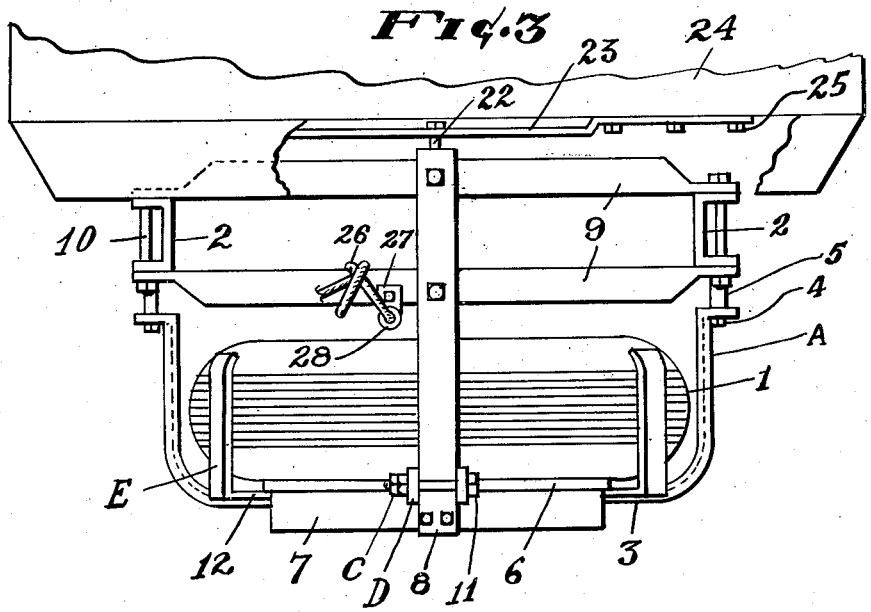
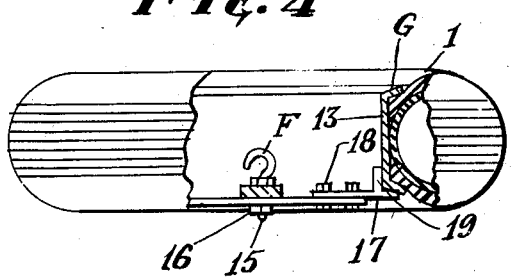
INVENTOR.
OTTO F. ULLMAN
BY U. G. Charles
Atty.

UNITED STATES PATENT OFFICE 2,400,274

SPARE TIRE CARRIER FOR TRUCKS OR THE LIKE

Otto F. Ullman, Ellsworth, Kans.

Application August 6, 1945, Serial No. 609,127

2 Claims. (Cl. 224—29)

This invention relates to a spare tire carrier or the like, and has for its principal object a means to support the tire between the side frames of a motor vehicle and a block and tackle to raise and lower the tire.

A still further object of this invention is to provide a carrying means for a spare tire that is inexpensive to manufacture and install the same, said means being efficient for its purpose and easily operated by a motorman without assistance.

A still further object of this invention is to provide a spare tire carrying means that may be operatively positioned forward or rearwardly of the rear axle, and being carried by the side bars of the vehicle in like manner as illustrated for its rearward position, and when forwardly positioned of said rear axle the carrying means may be turned through an arc of ninety degrees and secured to the side bars.

These and other objects will hereinafter be more fully explained, reference being had to the accompanying drawings forming part of this specification, and in which like characters will apply to like parts in the different views.

Referring to the drawings:

Fig. 1 is a plan view of the carrying frame of a vehicle, the bed being removed for convenience of illustration.

Fig. 2 is a side elevation to illustrate the pendant carrying means and tackle to raise and lower the tire.

Fig. 3 is a rear view of Fig. 2.

Fig. 4 is a view of a tire lying on its side, partly in section to illustrate the application of a spider carrying means to raise and lower the tire as secured on its demountable rim.

As a further description of the drawings, it will be seen in Fig. 1, that the spare tire 1 is carried between the side bars 2 of the vehicle frame but on a lower plane as shown in Fig. 2, said spare tire being carried on a frame consisting of cross bar 3, the major portion of which is horizontally disposed, downwardly positioned and pendantly carried by legs A upwardly extending to their respective side bars 2 and being secured thereby by bolts 4 that engages through sleeves 5 as spacing means for the upper extremity of said legs from their respective beams 2 as carrying means for rockable arms 6, the pivot points of which are on the said major portion of said cross bar 3, while the rear or other end of said arms 6 are carried by an angle bar 7 that is pendantly carried by a bar 8, the lower end of which is secured to the longitudinal center of said angle bar 7 whereby said rockable arms 6 at their rear end are adapted to slide from each other without obstruction to an extent as shown by their respective dotted lines B.

The said bar 8 is pendantly carried by cross bars 9 that are carried by said frame side bars 2, there being one of said cross bars above and one below said bars 2, and being secured at their ends by bolts 10 whereby the wheel carrying arms are supported but slidably mounted as above described and to be secured together by a bolt 11 having lock nuts C thereon to bind the ears D of the rockable arms to snug engagement with their confronting sides to said bar 8.

To secure the spare tire centrally resting on its respective arms is through the medium of anchor elements 12 that radially extend from the center of the spare tire and being adjustably secured to the arms as shown in Fig. 1. The outer ends of said anchor elements having upwardly turned portions E to engage across the tread of the tire as shown in Fig. 3, the upper ends of which are turned inward to avoid upward movement of said tire when the arms are secured together as above described.

As a means to raise and lower the spare tire it will be seen that the tire is mounted on a demountable rim 13 and to which a pair of bars transversely crossing each other are secured at their outer extremity to the rim as shown in Figs. 1 and 4, said bars being similar in construction consisting of body portions 14 that are secured together at their longitudinal center by a bolt-like element 15 having nuts 16 threadedly engaging thereon to clamp the bars together, said bolt-like element at its upper portion having a hook F integrally formed to the threaded bolt portion, said hook to be engaged by a block and tackle later described.

The outer end of each bar has a shank 17 secured thereto by a bolt 18, said shank having on its outer extremity a lug 19 transversely extending upward on the inward periphery of the rim and being spaced inward from the outer extremity of the shank that likewise seats on the flange G of the rim whereby the tire may be raised by a standard block and tackle, the blocks 20 having eyes 21 secured thereto to engage said hooks and another like-hook 22 respectively carried by a bar 23 that is secured to the underside of the vehicle bed 24 by bolts 25 and the said blocks each have pulleys journalled thereon on which is threaded cable 26 as tensioning means for the blocks toward and from each other, carrying the tire therewith, and the free end of the cable to be secured against retraction by toothed jaws 27 and 28, jaw element 27 being secured to the L-shaped cross bar 9 while the member 28 is pivotally connected as at H while the other end is turned upward and apertured to receive the cable engaging therethrough to rock the jaw upward as clamping means for the cable between the jaws, and the cable thus engaged may be tied securely to cross bar 9 substantially as shown in Fig. 3. By releasing the cable and rocking the said jaw downward is provided means to free the block and tackle for lowering the spare tire when said arms are moved outward from beneath the tire.

Such other modifications may be made as lie within the scope of the appended claims.

Having fully described my invention what I claim as new and desire to secure by Letters Patent is:

1. In a spare tire carrier for trucks or the like, in combination with a motor vehicle, a pair of bars spaced apart on a horizontal plane, and a bar pendantly carried by the motor vehicle transverse to its length, and another bar pendantly carried by the motor vehicle and being positioned in like manner to that of first said bar and being spaced therefrom a much greater distance than the diameter of a spare tire, a vertically disposed bar to pendantly carry second said bar by securing the same at its longitudinal center to the lower extremity of the vertically disposed bar, the upper extremity of which is secured to bars carried by the motor vehicle's side bars, a pair of arms spaced apart and being carried by the first and second said bars to function as carrying means for a spare tire, one corresponding ends of the arms being rockable connected to first said bar while the other ends are carried by second said bar, said other ends having vertically positioned ears to engage against the vertically disposed bar carrying means for second said bar, and bolt means to secure the ears firmly to said vertical bar when said spare tire is placed on the arms.

2. In a spare tire carrier for a truck, or the like, the truck having side bars on which to carry its super structure and beneath which a spare tire carrier is pendantly supported, and consisting of a bar having a body and leg portions, the body portion transversely crossing from said bar to a side bar and being on a horizontal plane while its legs upwardly extend and having means to secure the legs to the said side bars, and another bar, the body portion of which is straight and pendantly supported on the same plane corresponding to the body portion of first said legged bar and being well spaced therefrom in parallelism therewith, the pendant supporting means for said other bar being a vertically disposed member having one end secured to the longitudinal center of said other bar and means to secure the other end to the side bars of the truck, a pair of arms, one end portion of each being arced toward each other, the arcs terminating with apertured ears extending upward to engage on the pendant supporting member for said other bar and locked thereto by a bolt engaging through the apertures while the other ends of said arms are rockably secured to the body portion of the legged bar as carrying means for a spare tire lying on said arms, and means secured to the arms as centering and securing means for the spare tire to the arms, a block and tackle carried by the truck in registry with the tire's opening, means carried by the spare tire to be engaged by the block and tackle to raise and lower the said spare tire when the same is to be placed or removed from the arms substantially as shown and described.

OTTO F. ULLMAN.